(12) United States Patent
Haberman et al.

(10) Patent No.: US 7,490,344 B2
(45) Date of Patent: Feb. 10, 2009

(54) SYSTEM AND METHOD FOR SEAMLESS SWITCHING

(75) Inventors: Seth Haberman, New York, NY (US); Chester L. Schuler, Marlboro, MA (US); Abeljan van der Burgh, New York, NY (US); Alex Jansen, New York, NY (US); Gerrit Niemeijer, Maplewood, NJ (US)

(73) Assignee: Visible World, Inc., New York, NY (US)

( * ) Notice: Subject to any disclaimer, the term of this patent is extended or adjusted under 35 U.S.C. 154(b) by 637 days.

(21) Appl. No.: 09/735,983

(22) Filed: Dec. 13, 2000

(65) Prior Publication Data

US 2002/0122430 A1 Sep. 5, 2002

Related U.S. Application Data

(60) Provisional application No. 60/236,624, filed on Sep. 29, 2000.

(51) Int. Cl.
*H04N 7/173* (2006.01)

(52) U.S. Cl. .......................... 725/98; 725/131

(58) Field of Classification Search ................ 725/114, 725/131, 138, 139; 386/111, 124, 125, 6, 386/7, 70; 370/429, 509, 512, 528
See application file for complete search history.

(56) References Cited

U.S. PATENT DOCUMENTS

| 3,366,731 | A | 1/1968 | Wallerstein | 358/86 |
| 3,639,686 | A | 2/1972 | Walker et al. | 455/4.1 |
| 4,331,974 | A | 5/1982 | Cogswell et al. | 358/86 |
| 4,475,123 | A | 10/1984 | Dumbauld et al. | 358/86 |
| 4,573,072 | A | 2/1986 | Freeman | 358/86 |
| 4,602,279 | A | 7/1986 | Freeman | 358/86 |
| 4,625,235 | A | 11/1986 | Watson | 358/86 |
| 4,638,359 | A | 1/1987 | Watson | 358/142 |
| 4,703,423 | A | 10/1987 | Bado et al. | 395/201 |
| 4,716,410 | A | 12/1987 | Nozaki | 358/86 |
| 4,789,235 | A | 12/1988 | Borah et al. | 351/246 |
| 4,814,883 | A | 3/1989 | Perine et al. | 358/181 |
| 4,847,698 | A | 7/1989 | Freeman | 358/343 |
| 4,847,699 | A | 7/1989 | Freeman | 358/343 |
| 4,847,700 | A | 7/1989 | Freeman | 358/343 |
| 4,850,007 | A | 7/1989 | Marino et al. | 379/67 |
| 4,918,516 | A | 4/1990 | Freeman | 358/86 |
| 5,099,422 | A | 3/1992 | Foresman et al. | 358/86 |
| 5,105,184 | A | 4/1992 | Pirani et al. | 345/115 |
| 5,155,591 | A | 10/1992 | Wachob | 358/86 |
| 5,173,900 | A | 12/1992 | Miller et al. | 370/110.1 |

(Continued)

*Primary Examiner*—Hunter B. Lonsberry
(74) *Attorney, Agent, or Firm*—K & L Gates LLP (57) ABSTRACT

A method of preparing data streams to facilitate seamless switching by a switching device to produce an output data stream without any switching artifacts. Bi-directional switching between any plurality of data streams is supported The data streams are divided into segments, wherein the segments include synchronized starting points and end points. The data rate is increased before an end point of a segment. Gaps may be inserted between the segments. Increasing the data rate can include increasing a bandwidth of the plurality of data streams, for example by multiplexing, or compressing the data. The present invention can be used with media data streams, for example with MPEG encoded transport streams.

12 Claims, 5 Drawing Sheets

U.S. PATENT DOCUMENTS

| | | | |
|---|---|---|---|
| 5,220,501 A | 6/1993 | Lawlor et al. .................. 380/24 |
| 5,231,494 A | 7/1993 | Wachob ....................... 358/146 |
| RE34,340 E | 8/1993 | Freeman ........................ 358/86 |
| 5,253,940 A | 10/1993 | Abecassis .................... 400/495 |
| 5,260,778 A | 11/1993 | Kauffman et al. .............. 358/86 |
| 5,291,395 A | 3/1994 | Abecassis .................... 364/401 |
| 5,305,195 A | 4/1994 | Murphy ........................... 705/1 |
| 5,343,239 A | 8/1994 | Lappington et al. ............ 348/12 |
| 5,347,632 A | 9/1994 | Filepp et al. ............ 395/200.32 |
| 5,356,151 A | 10/1994 | Abecassis .................... 273/243 |
| 5,361,393 A | 11/1994 | Rossillo ...................... 395/651 |
| 5,377,354 A | 12/1994 | Scnnell et al. ............... 395/673 |
| 5,414,455 A | 5/1995 | Hooper et al. ................. 348/7 |
| 5,422,468 A | 6/1995 | Abecassis .................... 235/380 |
| 5,424,770 A | 6/1995 | Schmelzer et al. ............. 348/9 |
| 5,426,281 A | 6/1995 | Abecassis .................... 235/379 |
| 5,434,678 A | 7/1995 | Abecassis .................... 358/342 |
| 5,442,390 A | 8/1995 | Hooper et al. ................. 348/7 |
| 5,442,771 A | 8/1995 | Filepp et al. ............ 395/200.49 |
| 5,446,919 A | 8/1995 | Wilkins ....................... 455/6.2 |
| 5,448,568 A | 9/1995 | Delpuch et al. ............ 372/94.2 |
| 5,499,046 A | 3/1996 | Schiller et al. ................ 348/6 |
| 5,515,098 A | 5/1996 | Carles ........................... 348/8 |
| 5,515,270 A | 5/1996 | Weinblatt .................... 395/214 |
| 5,519,433 A | 5/1996 | Lappington et al. ............. 348/2 |
| 5,526,035 A | 6/1996 | Lappington et al. ............ 348/13 |
| 5,537,141 A | 7/1996 | Harper et al. ................. 348/12 |
| 5,548,532 A | 8/1996 | Menand et al. .............. 364/514 |
| 5,550,735 A | 8/1996 | Slade et al. |
| 5,566,353 A | 10/1996 | Cho et al. ....................... 455/2 |
| 5,584,025 A | 12/1996 | Keithley et al. ............. 707/104 |
| 5,585,838 A | 12/1996 | Lawler et al. |
| 5,585,858 A | 12/1996 | Harper et al. ............... 348/485 |
| 5,594,910 A | 1/1997 | Filepp et al. ............ 395/800.28 |
| 5,610,653 A | 3/1997 | Abecassis .................... 348/110 |
| 5,617,142 A | 4/1997 | Hamilton .................... 348/405 |
| 5,632,007 A | 5/1997 | Freeman ...................... 395/75 |
| 5,634,849 A | 6/1997 | Abecassis .................... 463/30 |
| 5,636,346 A | 6/1997 | Saxe ........................... 395/201 |
| 5,638,113 A | 6/1997 | Lappington et al. ........... 348/12 |
| 5,652,615 A | 7/1997 | Bryant et al. |
| 5,671,225 A | 9/1997 | Hooper et al. ............... 370/468 |
| 5,682,196 A | 10/1997 | Freeman ...................... 348/13 |
| 5,684,918 A | 11/1997 | Abecassis .................... 386/83 |
| 5,696,869 A | 12/1997 | Abecassis .................... 386/52 |
| 5,717,814 A | 2/1998 | Abecassis .................... 386/46 |
| 5,717,923 A | 2/1998 | Dedrick ..................... 707/102 |
| 5,724,091 A * | 3/1998 | Freeman et al. ............. 725/138 |
| 5,724,472 A | 3/1998 | Abecassis .................... 386/52 |
| 5,724,521 A | 3/1998 | Dedrick ........................ 705/26 |
| 5,734,413 A | 3/1998 | Lappington et al. ........... 348/12 |
| 5,740,388 A | 4/1998 | Hunt ........................... 395/328 |
| 5,740,549 A | 4/1998 | Reilly et al. .................... 705/14 |
| 5,754,939 A | 5/1998 | Herz et al. .................... 455/4.2 |
| 5,758,259 A | 5/1998 | Lawler |
| 5,761,601 A | 6/1998 | Nemirofsky et al. ......... 455/3.1 |
| 5,764,275 A | 6/1998 | Lappington et al. ........... 348/12 |
| 5,768,521 A | 6/1998 | Dedrick ................. 395/200.54 |
| 5,774,170 A | 6/1998 | Hite et al. ....................... 348/9 |
| 5,774,664 A | 6/1998 | Hidary et al. .......... 395/200.48 |
| 5,778,181 A | 7/1998 | Hidary et al. .......... 395/200.48 |
| 5,784,095 A | 7/1998 | Robbins et al. ................. 348/6 |
| 5,784,528 A | 7/1998 | Yamane et al. .............. 386/112 |
| 5,796,945 A | 8/1998 | Tarabella ................ 395/200.49 |
| 5,802,314 A | 9/1998 | Tullis et al. ............ 395/200.76 |
| 5,805,974 A | 9/1998 | Hite et al. |
| 5,825,884 A | 10/1998 | Zdepski et al. ................ 380/25 |
| 5,835,087 A | 11/1998 | Herz et al. ................... 345/327 |
| 5,861,881 A * | 1/1999 | Freeman et al. .......... 715/500.1 |
| 5,867,208 A | 2/1999 | McLaren ..................... 348/13 |
| 5,873,068 A | 2/1999 | Beaumont et al. |
| 5,887,243 A | 3/1999 | Harvey et al. ................ 455/3.1 |
| 5,903,263 A * | 5/1999 | Emura ........................ 725/116 |
| 5,907,837 A | 5/1999 | Ferrel et al. ..................... 707/3 |
| 5,913,031 A | 6/1999 | Blanchard .............. 395/200.34 |
| 5,917,830 A * | 6/1999 | Chen et al. ................... 370/487 |
| 5,929,850 A | 7/1999 | Broadwin et al. ........... 345/327 |
| 5,931,901 A | 8/1999 | Wolfe et al. ................. 709/206 |
| 5,937,331 A | 8/1999 | Kalluri et al. ................ 455/6.1 |
| 5,978,799 A | 11/1999 | Hirsch .......................... 707/4 |
| 5,986,692 A | 11/1999 | Logan et al. .................. 348/13 |
| 5,991,735 A | 11/1999 | Gerace ........................ 705/10 |
| 6,002,393 A | 12/1999 | Hite et al. .................... 345/327 |
| 6,018,768 A | 1/2000 | Ullman et al. .............. 709/218 |
| 6,026,368 A | 2/2000 | Brown et al. .................. 705/14 |
| 6,029,045 A | 2/2000 | Picco et al. .................... 455/5.1 |
| 6,038,000 A * | 3/2000 | Hurst, Jr. ................. 375/240.26 |
| 6,038,367 A | 3/2000 | Abecassis .................... 386/46 |
| 6,049,569 A | 4/2000 | Radha et al. ................ 375/240 |
| 6,067,348 A | 5/2000 | Hibbeler .................. 379/88.16 |
| 6,075,551 A | 6/2000 | Berezowski et al. ........... 348/9 |
| 6,108,486 A | 8/2000 | Sawabe et al. ................. 386/98 |
| 6,137,834 A | 10/2000 | Wine et al. .................. 375/240 |
| 6,141,358 A | 10/2000 | Hurst, Jr. et al. ............ 370/543 |
| 6,160,570 A | 12/2000 | Sitnik ............................. 348/1 |
| 6,304,852 B1 | 10/2001 | Loncteaux .................... 705/14 |
| 6,310,915 B1 * | 10/2001 | Wells et al. ............ 375/240.03 |
| 6,327,574 B1 | 12/2001 | Kramer et al. ................. 705/14 |
| 6,330,286 B1 * | 12/2001 | Lyons et al. ............ 375/240.28 |
| 6,343,287 B1 | 1/2002 | Kumar et al. .................... 707/4 |
| 6,357,042 B2 | 3/2002 | Srinivasan et al. |
| 6,360,234 B2 | 3/2002 | Jain et al. |
| 6,408,278 B1 | 6/2002 | Carney et al. |
| 6,411,992 B1 | 6/2002 | Srinivasan .................. 709/218 |
| 6,424,991 B1 | 7/2002 | Gish .......................... 709/203 |
| 6,449,657 B2 | 9/2002 | Stanbach, Jr. et al. ....... 709/245 |
| 6,457,010 B1 | 9/2002 | Eldering et al. |
| 6,463,444 B1 | 10/2002 | Jain et al. |
| 6,463,585 B1 | 10/2002 | Hendricks et al. .............. 725/35 |
| 6,466,975 B1 | 10/2002 | Sterling ...................... 709/223 |
| 6,502,076 B1 | 12/2002 | Smith |
| 6,567,980 B1 | 5/2003 | Jain et al. |
| 6,574,793 B1 | 6/2003 | Ngo et al. |
| 6,588,013 B1 | 7/2003 | Lumley et al. |
| 6,601,237 B1 | 7/2003 | Ten Kate et al. |
| 6,611,624 B1 * | 8/2003 | Zhang et al. ................. 382/232 |
| 6,671,880 B2 | 12/2003 | Shah-Nazaroff et al. |
| 6,678,332 B1 * | 1/2004 | Gardere et al. ......... 375/240.26 |
| 6,681,395 B1 | 1/2004 | Nishi et al. |
| 6,694,482 B1 | 2/2004 | Arellano et al. |
| 6,698,020 B1 | 2/2004 | Zigmond et al. |
| 6,735,628 B2 | 5/2004 | Eyal |
| 6,785,289 B1 * | 8/2004 | Ward et al. .................. 370/412 |
| 6,806,909 B1 * | 10/2004 | Radha et al. .............. 348/384.1 |
| 6,850,252 B1 | 2/2005 | Hoffberg |
| 6,857,024 B1 | 2/2005 | Chen et al. |
| 6,877,134 B1 | 4/2005 | Fuller et al. |
| 2001/0013124 A1 | 8/2001 | Klosterman et al. |
| 2002/0026359 A1 | 2/2002 | Long et al. |
| 2002/0056093 A1 | 5/2002 | Kunkel et al. |
| 2002/0057336 A1 | 5/2002 | Gaul et al. |
| 2002/0083443 A1 | 6/2002 | Eldering et al. |
| 2002/0092017 A1 | 7/2002 | Klosterman et al. ........... 725/35 |
| 2002/0095676 A1 | 7/2002 | Knee et al. ..................... 725/46 |
| 2003/0110500 A1 | 6/2003 | Rodriguez |
| 2003/0177503 A1 | 9/2003 | Sull et al. |
| 2004/0025180 A1 | 2/2004 | Bageja et al. |
| 2004/0111742 A1 | 6/2004 | Hendricks et al. |
| 2004/0136698 A1 | 7/2004 | Mock |
| 2005/0086691 A1 | 4/2005 | Dudkiewicz et al. |
| 2005/0086692 A1 | 4/2005 | Dudkiewicz et al. |
| 2005/0166224 A1 | 7/2005 | Ficco |

* cited by examiner

SYSTEM AND METHOD FOR SEAMLESS SWITCHING

CROSS-REFERENCE TO RELATED APPLICATIONS

This patent application claims priority from U.S. Provisional Application Ser. No. 60/236,624 filed Sep. 29, 2000 by Haberman et al., which is incorporated herein by reference.

FIELD OF THE INVENTION

This disclosure relates, generally, to a system and method for transmitting data and, more particularly, to a system and method of seamless switching between a plurality of data streams.

BACKGROUND

Typical television broadcasts do not allow personalization of television content to an end user's profile. The standard television broadcast provides only one variant of every channel. The channel is selected by the viewer and the STB (set top box) selects the video and audio for that channel from the broadcast material. While this system allows the viewer to select their favorite channel or show from the available set, the individual viewer will be watching exactly the same content as everyone else that selects that channel.

Due to the fact that channels are created to attract a wide range of viewers, viewers typically have different preferred channels. Disadvantageously, this is particularly evident when a program being broadcast on a channel is interrupted by a commercial advertisement that does not appeal to the interests of the viewer. The inevitable result is that the viewer will switch to another channel to avoid watching that particular commercial advertisement. It would be advantageous to personalize channels to be viewed by a viewer tailored to their particular interests and personal situations, including personalized ads or messages which make such ads more relevant to the viewer.

A method of creating personalized messages is disclosed in co-pending U.S. patent application Ser. No. 09/545,015 filed on Apr. 7, 2000, which is incorporated herein by reference. Personalized versions of advertisements or entire programs can be created on a group or individual level. One technique which can assist in the process of assembling personalized messages is the ability to switch rapidly between multiple data streams (such as audio and/or video feeds), in order to assemble the message in real time, possibly as the message is being viewed by the end user.

However, switching between multiple data streams is problematic. One problem is that switching may not be instantaneous. With present technology, it is difficult to switch from one high-bandwidth data stream to another without missing some data during the time the switch is switching. This is true no matter what the type of data stream is, including analog signals, digitized signals, digital data, multiplexed digital data etc., or the type of switch, whether electromechanical, solid state, analog or digital demultiplexer, or a software switch. Also, timing the switch point to minimize data interruption is very difficult. The act of switching typically results in a switch gap, a period of no data during the interim while the switch is switching between data streams. For multimedia (such as television) signals, switching introduces audible and visible artifacts in the sound and picture.

An example of this switching problem also occurs with MPEG-2 encoding. MPEG-2 defines a broadcast quality standard for multimedia signals, based on digital technology. The MPEG-2 standard includes the capability for compressing, coding and transmitting high-quality multi-channel, multimedia signals over broadband networks. MPEG-2 defines standards for program streams and transport streams. The program stream provides video, audio and data elements that have a common time base. The transport stream combines several programs into a single stream, wherein the programs may not have a common time base. MPEG-2 encodes media signals as frames, and switching between MPEG-2 encoded transport streams requires frame-accurate switching to avoid switching artifacts.

Figure 1:
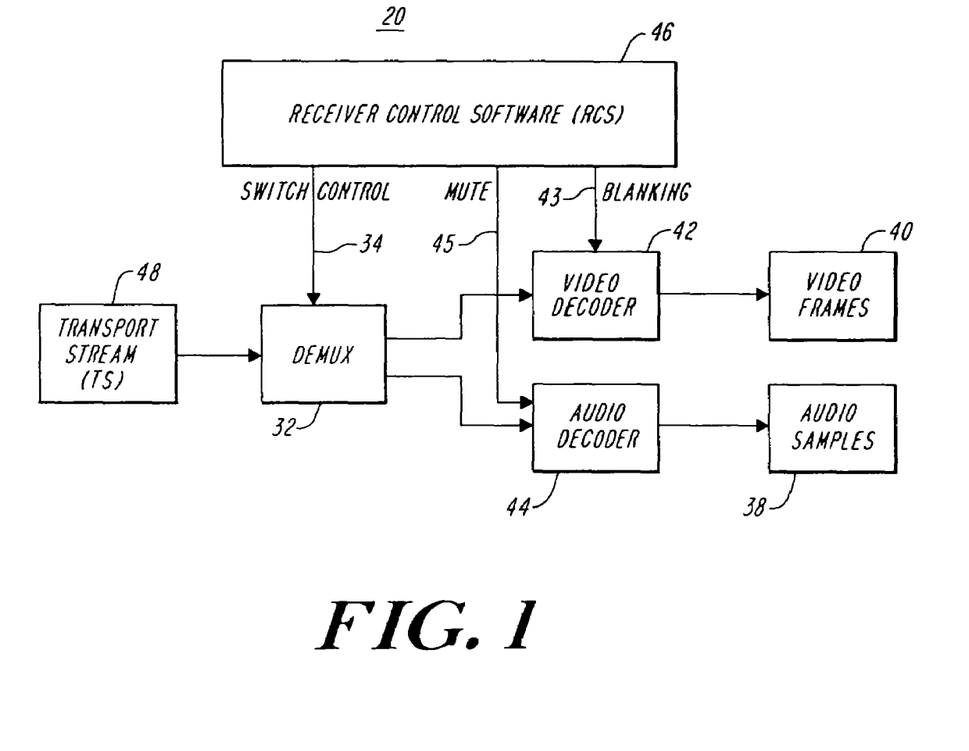
FIG. 1 is a block diagram of some components of a digital receiver.

FIG. 1 shows switching and decoding components of an example digital television receiver 20. The transport stream 48 carrying multiple encoded data streams enters the demux (demultiplexer) 32. This demux 32 serves as the switch, by selecting which data stream in the multiplexed transport stream to pass on. The selected data stream includes both a video stream and an audio stream. These streams are then decoded respectively by a video decoder 42 and an audio decoder 44. The video decoder 42 and audio decoder provide buffering on these input streams. The results of the decoding are a stream of video frames 40 and audio samples 38, which can then be sent to display and audio equipment. The decoder is controlled by a receiver controller 46, which typically uses a microprocessor and software.

Normally, when switching between different video 40 and audio tracks 38 within the Transport Stream 48, the receiver controller 46 first mutes/blanks the affected decoder, (as shown by arrows 43 and 45, then switches the Demux 32 settings and then unmutes/unblanks the decoder(s). This will present a moment of silence/black to the viewer. It will never be a seamless switch for the viewer.

In an attempt to get a seamless switch, the mute/unmute sequence may be skipped. Now, however, the results depend on the exact moment of the switch with respect to the incoming data from the transport stream. Digital compression and transmission creates interdependencies between groups of video frames because of encoding and packaging and groups of audio samples because of packaging. Only at certain points within the data stream of the transport stream is it safe (W.R.T. visible and audible artifacts) to switch out of the current stream or into another stream. The requirement of exactly hitting a combination of safe exit and safe entry point make the seamless switch very difficult. In addition to this, the decoders 42, 44 are typically the only devices in the receiver 20 that can detect the right moment, while the demux 32 is the device that must be switched. Because of extensive data buffering between the demux and the decoders, detection by the decoder is of no use to determine the right moment to switch the demux.

It may be possible to add a detection device to the demux that would duplicate part of the task of the decoder with a defined timing relation to the transport stream data. This would allow detection of safe exit points. However, this solution requires extra hardware, and thus is incompatible with all existing receivers.

Because of the way that digital television receivers are constructed, the switching mechanism that allows the selection of video and audio streams from the transport stream is located before the playback buffering. And because the data is transmitted in burst-mode, there is no way to know the fill level of the buffer without detailed knowledge of the incoming transport stream, and the current playback time of the receiver.

One solution would be to build new receivers with specialized hardware and software (including buffering at several locations in the receiver) to support such switching. However, this solution increases the cost and complexity of receivers, and can not take advantage of the existing receivers on the market.

SUMMARY

In accordance with the present invention, there is provided a transmission system and method for seamlessly switching between a plurality of data streams to produce an output data stream with minimal or without any switching artifacts. Preferably, the seamless switch includes no visual or audible artifacts of the switch during reproduction of data. The disclosed transmission system and method for seamless switching may be utilized in applications including slot based broadcasts where frame and sample accurate switching in a digital television environment is required. The system and method can facilitate multi-directional switching and does not require extensive modification to existing devices. Most desirably, the present disclosure finds application in personalized television.

The present invention includes a method of preparing a plurality of data streams to allow seamless switching between the data streams by a switching device. The switching device may include data stream buffering for an output data stream. The method includes providing a plurality of data streams, where the data streams include data which is divided into segments that include synchronized starting points and end points on all of said plurality of data streams. The method includes providing gaps in the data streams between the end points and starting points, and increasing a data rate of the data streams at a time before an end point of a segment. This increase of the data rate can be performed by a number of techniques, alone or in combination, including multiplexing, variations in multiplexing, compression, changes in QOS (quality of service), using additional data streams, etc. The present invention includes switching from one of the plurality of data streams to another one of the data streams at an end point of a segment. Trigger gap indicators can be inserted in the data streams proximate the end points, to indicate to a switch that a switch point is present or imminent.

An illustrative embodiment of the present invention is used to encode MPEG-2 transport streams with multimedia data signals. This allows a receiver, such as a digital set top box, to seamlessly switch between multiple channels and produce output with no switching artifacts.

U.S. Pat. No. 5,913,031 issued to Blanchard describes an encoder for system level buffer management. However this patent describes maintaining a substantially constant data stream rate, with minor long-term adjustments to keep a post-switch frame buffer(s) full. This patent uses complex signal data rate analysis to maintain full frame buffers, and does not disclose a feature of adjusting a data rate to momentarily increase storage in the frame buffers. Further, this patent does not teach the creation of gaps in a data stream. Finally, this patent focuses on maintaining full buffers only through compression of data.

An advantage of the present invention is a transmission system and method of seamlessly switching between a plurality of data streams to produce an output data stream without any switching artifacts.

Another advantage of the present invention includes a system and method for seamless switching using presently deployed receiver systems such as digital set top boxes (STB). No extra buffering is required to be added to present receivers.

Another advantage of the present invention includes a system and method for seamless switching that facilitates multi-directional switching and does not require extensive modification to the existing devices.

Yet another advantage of the present invention includes a system and method for seamless switching that can be employed with personalized television applications.

BRIEF DESCRIPTION OF THE DRAWINGS

The accompanying drawings, referred to herein and constituting a part hereof, illustrate the exemplary embodiments of the system and method for seamless switching of the present invention and, together with the description, serve to explain the principals of the invention.

DETAILED DESCRIPTION

The present invention finds utility in various data transmission applications including analog and digital broadcasting, cable, cellular, satellite and terrestrial broadcasts, Video on Demand, Digital Versatile Disc (DVD), Internet, ethernet, wireless, ATM, MPEG (including MPEG 1, 2, 4 and variations thereof), AC3 etc.

When switching from one source to another, the physical switch takes time, both in hardware, but also in software. In a digital television receiver for example, the input streams for audio and video are time multiplexed with other information into a transport stream. This time multiplexing makes it necessary to send the audio and video data in bursts and ahead of the presentation time. The data is buffered in the receiver 20 FIG. 1 and played out at a predetermined moment relative to a presentation clock. Because of the way that digital television receivers are constructed, the switching mechanism that allows the selection of video and audio streams from the transport stream is located before the playback buffering. And because the data is transmitted in burst-mode, there is no way to know the fill level of the buffer without detailed knowledge of the incoming transport stream, and the current playback time of the receiver. There is also no way to know where the other audio and video stream transmissions are in relation to the current one.

The way MPEG video is encoded makes it necessary to switch at the start of a video sequence, because otherwise the receiver has to wait for the start of the next sequence (for example, wait for the next I-Frame). A similar problem exists for audio, where if packets are missed, the audio sequence may be able to recover, but not without causing switching artifacts. All this makes the exact moment of switching over very critical, while there is no information embedded in the transport stream to find out what is being received in relation to the presentation time. The latency of the receiver processing system is also too big to react on what is being received without knowing ahead of time what will be coming. The conclusion can be that without the proper preparation of the transport stream to give the receiver time to react, the results of a switch will be non-deterministic.

Figure 2:
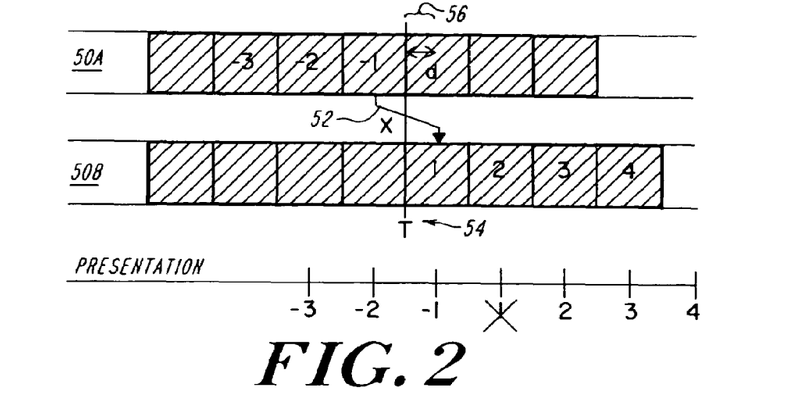
FIG. 2 shows switching in one direction between time synchronized data streams.

FIG. 2 shows one-directional switching between two data streams. For this example, consider two continuous MPEG-2 video streams, 50A and S0B, where a cross over point X 52 is defined at time T 54. Because the physical switch in the receiver takes time (d) 56, frame 1 in stream 50B is not received completely, and cannot be presented. The next completely received frame will be frame 2 of stream 50B (assuming that d is smaller than one frame transmission time, which is true for present switches). However, if frame 1 was the start of a sequence, then frame 2 may not be able to be presented because frame 2 depends on frame 1. For example if frame 1 is the start of a sequence, then frame 1 might be an I-Frame (intrapicture frame). I-Frames are coded independently of all previous or future frames. Frame 2 would be a P-Frame (predictive frame), which is coded based on previous I-Frames or P-Frames; or B-Frame (bidirectionally predictive frame), which is coded based on the next and/or previous frames. If frame 1 was not received, then frame 2 could not be displayed, or any subsequent P-Frames or B-Frames until the next I-Frame is received.

To get the cross over point to work, the transmission of frames in 50B is delayed in relation to 50A by at least the switching time (d) 56 to give the receiver time to react. This is shown with added delay 57 FIG. 3 to stream 50B. There also is an indicator 58 FIG. 3 to signal to the receiver that the cross over point has been reached.

Figure 3:
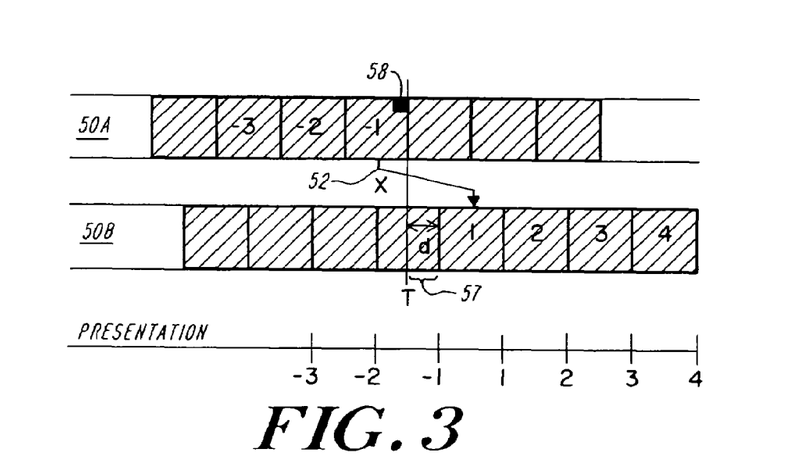
FIG. 3 shows the time synchronized data streams of FIG. 2 with an included switching delay.
Figure 4:
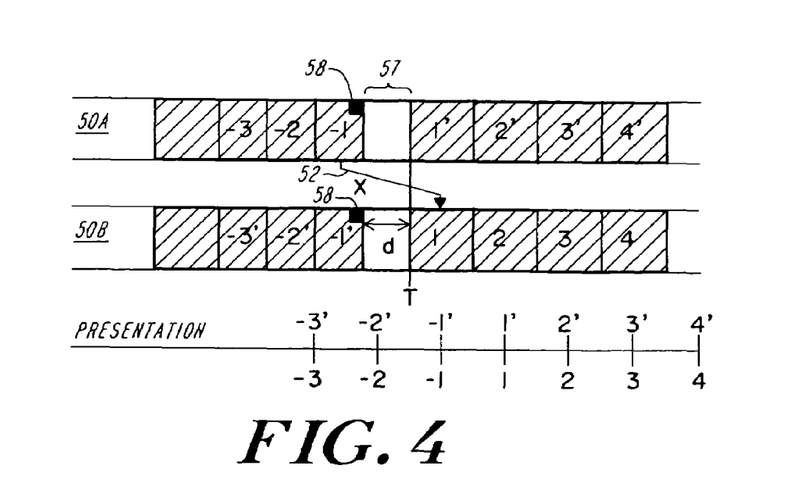
FIG. 4 shows the time synchronized data streams of FIG. 3 in accordance with the present invention.

While this solution will work for the switch from 50A to 50B, it will not work for a switch from 50B to 50A at X 52. The solution will not work if X 52 is a bi-directional cross over point, because a system would also have to delay 50A with respect to 50B by at least switching time d 58 and that is not possible. The way to achieve this is to delay the transmission of the frames after the cross over point X 52 for both streams 50A and 50B without delaying the frames before the cross over point X 52, as illustrated in FIG. 4.

The present invention can exploit burst-mode transmission and the time presentation of the digital television system to solve the problem. By preparing the transport stream in such a way that the playback buffer is filled with frames from before the cross over point X 52, the buffered frames can bridge the switching delay 56. So instead of delaying the transmission, an embodiment of the present invention sends frames ahead of time and uses the buffer and presentation timing to its advantage.

Thus, by utilizing the independence between reception and presentation of the digital television systems, the present invention introduces a discontinuity in the transmission of all streams and creates a situation where a switch make a switch from 50A to 50B and from 50B to 50A, a bi-directional cross over point. The number of parallel streams at the cross over point does not matter, thus the present invention can be scaled up to any number of streams and is in fact a multi-directional seamless switch point.

Although described in terms of MPEG-2 encoded transport streams, the present invention will work with any type of data streams, in any situation wherein some control is provided over the data stream rates, such control being for example varying the bandwidth, varying the packet send rates, modifying the data stream multiplexing, compressing the data in the data streams, compressing the content streams etc.

One embodiment of the present invention includes modifications to the layout of the transport stream, and transport stream generation equipment. This includes the addition of safe exit and safe entry points at the right points in the transport stream. The conditions for these points exactly match the conditions for standardized splicing points, so standard encoding equipment that supports splicing points can be used to generate the right streams. The addition of the transmission delay gap is not standard, although its creation is not unlike the operation of a statistical multiplexer which, based on certain input parameters, can vary the bandwidth assigned to individual streams. For this embodiment, the bandwidth should be increased in the period before the gap, in order to pre-send all of the information that would have been sent during the gap if the stream distribution was constant. When that information has been sent, the bandwidth must be reduced to zero to stop the transmission of that stream completely, thus creating the switch gap.

An illustrative embodiment will now be presented for how an MPEG-2 transmission system or relay system (like a cable head-end) can be extended to provide the outgoing transport stream that supports seamless switching. While the diversity among MPEG-2 receivers is relatively small for the MPEG-2 processing part, the diversity among transmission systems can be very big. For that reason this description focuses on the basic elements involved in the creation of a seamless switch compatible transport stream, to allow one skilled in the art for a specific transmitter arrangement to adapt the techniques to that specific transmitter arrangement.

Figure 5:
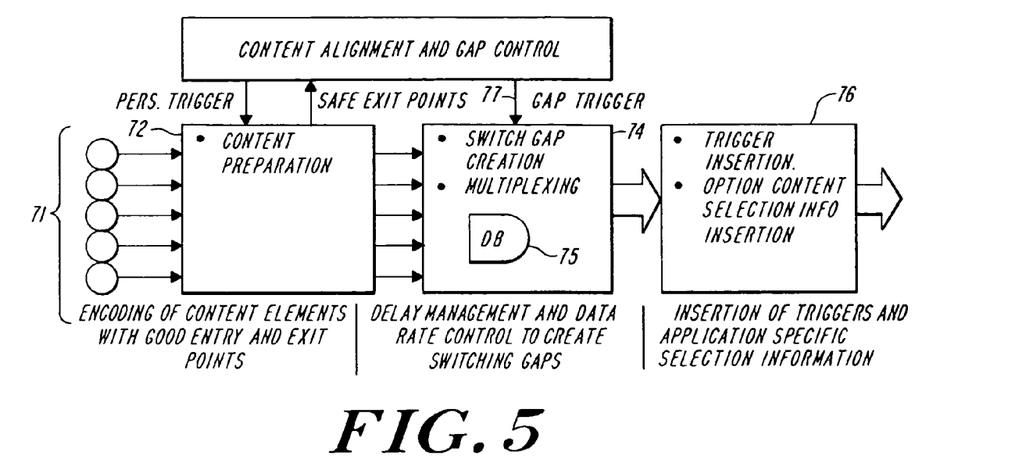
FIG. 5 is a flow diagram for transport stream generation according to an illustrative embodiment.

FIG. 5 shows a flow diagram with the steps involved in the creation of a seamless switch ready transport stream. Multiple content material input streams 71 are prepared, for example in parallel. Note that an actual implementation may combine steps or split them up differently based on the architecture of the actual equipment involved. As long as the resulting transport stream has the correct elements, any implementation is valid.

The first step is content preparation 72. In order to allow seamless switching at the switch point the content material is prepared with correct safe entry and safe exit points. The encoding at these points is equal to splicing points, but the splicing point count down and indication does not necessarily have to be present for seamless switching, since other triggers will indicate the switching moment. Because, after the switching moment, all parallel streams will have to start with an I-Frame, a burst of data across the transport stream is expected at that point. It is possible to limit the quality of these first I-Frames, or use fixed rate multiplexing. Because of the interaction between the individual streams with respect to the overall transport stream bandwidth, it may be easier to combine content preparation with switch gap creation and multiplexing. This depends on the overall architecture of the equipment.

Content preparation 72 can be an offline process, taking place well in advance of actual transmission. It can also be mixed, with one or multiple streams being processed in real-time, while other streams are prepared offline.

The next step is switch gap creation and multiplexing 74. In order to allow frame accurate seamless switching in all directions between several different streams, special multiplexing requirements are provided. First of all the switch gap is created. The requirement for the stream around the gap is that all the information that is necessary for the duration of the gap is transmitted before the gap. This is achieved by having the data available ahead of time. One method is if the multiplexer has on-demand control over the influx of data, and can request extra data at any time. To create this gap in a continuous stream of data without control over the source of the data, a delay buffer 75 is used. This buffer 75 continuously delays the stream by a fixed amount of time and thus creates a limited amount of read ahead control over the incoming data. On demand the multiplexer can read the data in the delay buffer faster than the continuous data rate, as long as the faster read is compensated afterwards. Since the average data rate over the speed-up and the gap is the same as the continuous data rate, there is no problem. The end result is a continuously variable delay line with a control unit that follows a preset delay pattern when triggered.

The time needed for the gap is the time needed for the receiver to switch, and depends on the hardware and software of the receiver. In the case of STB receivers, the gap timing may vary based on the brand of STB. Interestingly enough, since a particular television distribution network (such as a cable headend system or neighborhood distribution network) typically depends on all STBs being the same type, the present invention allows gap timing to be adjusted at a television network distribution network to match the requirements of the common STB in use on that distribution network. Other distribution networks can have gap timing commensurate with the STBs on those networks. Alternatively, the gap timing may be adjusted to accommodate the slowest switching time of a set of different STBs.

Figure 6:
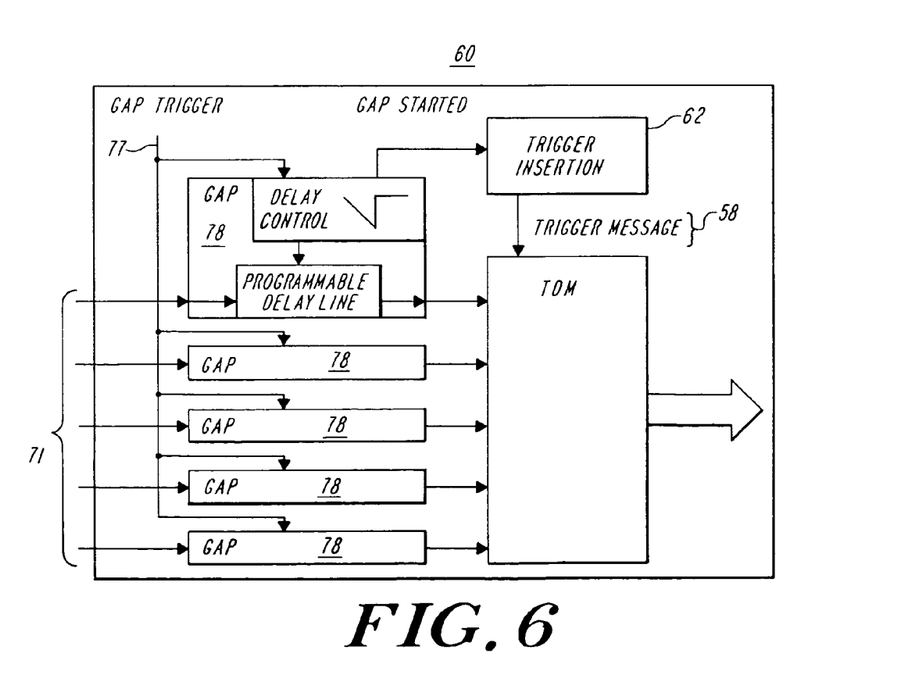
FIG. 6 is a block diagram of a switch gap inserting multiplexer according to an illustrative embodiment.

FIG. 6 outlines an example gap creating multiplexer 60. This multiplexer 60 combines features of both steps 74 and 76 of FIG. 5, since trigger insertion 76 is closely timed to the switch gap creation 74. The gap trigger 77 FIG. 6 causes the gap delay components 78 to delay the content material input streams 71 for the duration of the gap time. Also, trigger insertion 62 occurs to insert a trigger message 58 into the input streams at the switching point. The trigger message 58 can have different formats. It can be a separate private PES packet time synchronized with the content streams. The trigger message 58 can also be an indicator packed into one of the content streams. Basically, anything that can be detected by the receiver and has a fixed timing relation with the Switch Gap can be used as a Trigger Message 58.

Content selection info insertion is an optional part of this step 74 FIG. 5. Depending on the application that makes use of the seamless switching facilities, special content selection information may need to be inserted into the outgoing transport stream. This information has a time relation with the switch gaps, but only in the sense that the selection information must be available before the choice has to be made and must have a mapping to the corresponding switch gap. Typically the actual information in this data stream is completely dependent on the application.

Figure 7:
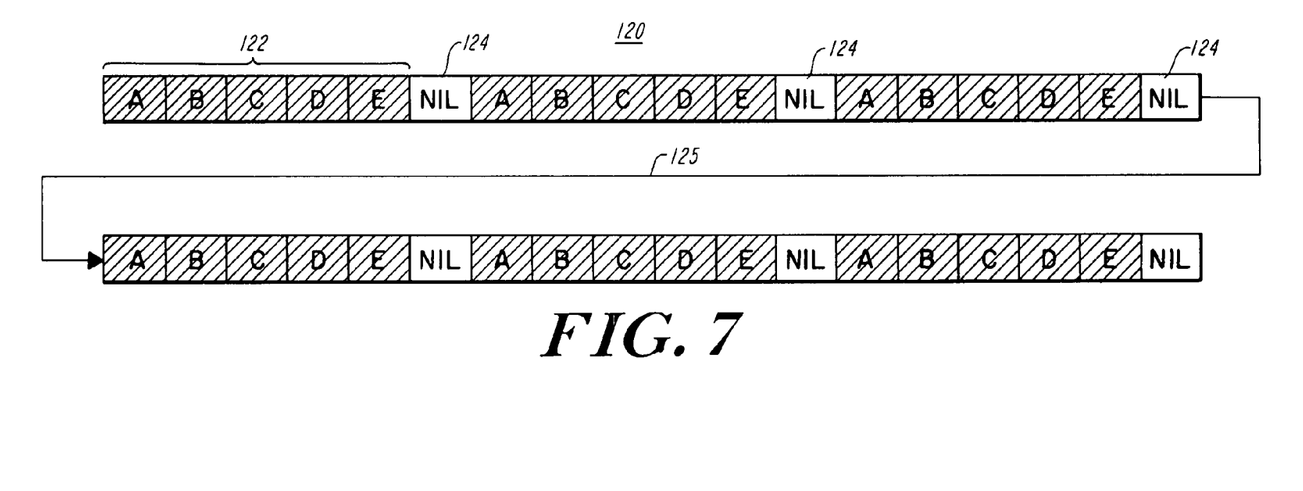
FIG. 7 is a block diagram of a multiplexed data stream.

FIG. 7 shows a sample multiplexed data stream 120. This multiplexed data stream for example can be a transport stream according to MPEG-2 standards. The multiplexed data stream 120 includes packets that are time multiplexed together, as shown by packets A-E, indicated by label 122. Each of the packets A-E are for a different content stream. The data flow is continuous, as shown by arrow 125. The bandwidth of the multiplexed data stream 120 is higher than required to supply the packets 122, therefore empty transport stream packets 124 are inserted. These packets 124 may be "empty", or carry other data separate from the content stream packets 122.

Figure 8:
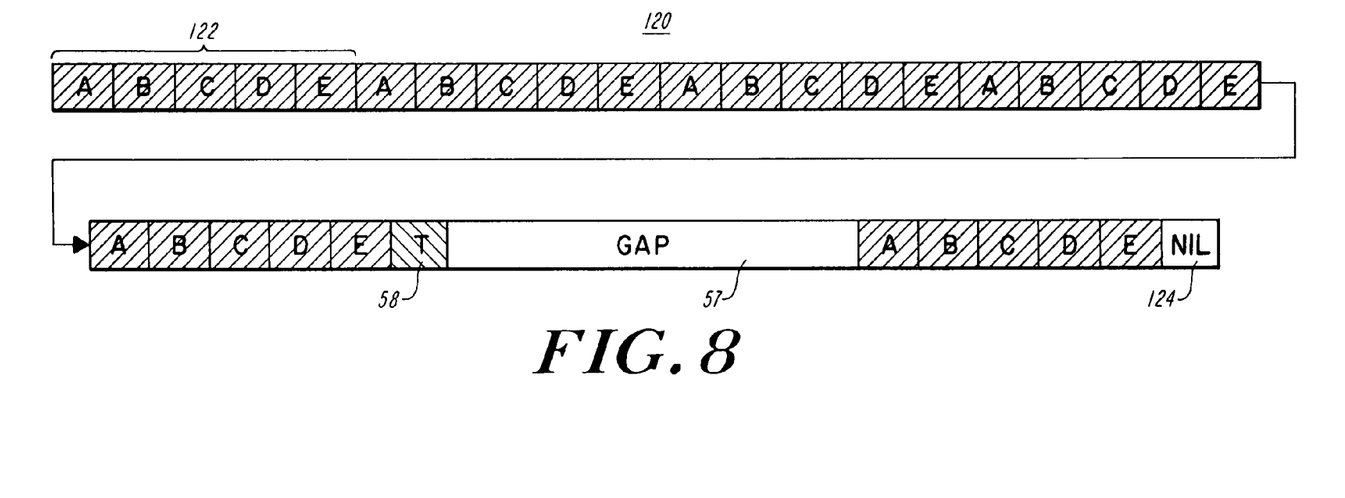
FIG. 8 shows the multiplexed data stream of FIG. 7 as modified by an illustrative embodiment.

FIG. 8 shows the multiplexed data stream 120 at a point just before and after a gap 57 is inserted, in accordance with an illustrative embodiment. The packets 122 are still sent, but to increase the data rate, the empty transport stream packets 124 are reduced or eliminated at a time before the gap 57. This increases the data delivery rate for the content streams provided by the packets 122. Just before the gap 57, a switch trigger message 58 is inserted. As previously described, the switch trigger 58 may be a special (possibly empty) packet which is inserted by the switch gap inserting multiplexer 60 FIG. 6 for example, or the switch trigger 58 may be an indication on another packet. In this embodiment, the gap 57 comprises empty (NIL) packets. One way for a time division multiplex (like an MPEG-2 transport stream) to avoid sending relevant data is to send something else, so to create a gap in the data streams A-E, different packets are sent, either packets from unrelated streams, or empty packets. After the gap 57, the data delivery rate is decreased by again inserting the empty transport stream packets 124.

The following calculation example provides details assuming an MPEG-2 transport stream (188 bytes per packet) and the requirement of a 30 ms switch gap (see below). It also assumes 4 Mbps for the content streams. To create a gap of about 30 ms in a 27 Mbps transport stream, 540 transport stream packets must be cleared ((27,000,000/(8*188)) *0.030). If there are five parallel 4 Mbps (roughly 81 TS packets in 30 ms) streams that need to have the switch gap at the same time, then 5*81=405 packets (N) of those five streams together must be moved forward (earlier) out of the switch gap area. All other content in the transport stream can be left in the gap; only the relevant streams need to be moved out. Alternatively, other information can be placed in the empty packets in the gap. The available spare bandwidth in the transport stream determines the time over which the streams transmission would have to be condensed. With a spare bandwidth (S) specified in bps, the amount of time needed to create the 30 msec gap would be (N*1504)/S. In this case it would be 405*1504/4000000=150 msec.

Therefore with this transport stream configuration the illustrative embodiment would need to start sending information ahead about 180 msec before the start of the next fragment. That way it would finish sending all the information up to the start of the next fragment 30 msec before the actual start of that fragment, thus creating a 30 msec gap. Note that the maximum amount of transport stream packets that needs to be moved is bound by the overall transport stream bandwidth.

The actual required gap depends on the response speed of the software in the receiver 20. A gap of 30 msec (roughly one frame) is assumed to be the typical maximum needed for most receivers.

An illustrative embodiment for the transport stream generation device and multi-direction seamless switching is the personalization of TV commercials in a digital television environment. In this application a personalized commercial would consist of several sequential fragments (slots), each having several parallel options. All options for a slot would be transmitted simultaneously within the same transport stream and, at the beginning of each slot, a decision would be made by the receiver which of the options for this slot to show to the viewer. The personalized ad would be inserted into the flow of the main program in a time slot that would be big enough for the total personalized ad (typically 30 seconds). Within the main program a trigger would be present to tell the ad insertion equipment to insert the personalized ad. The ad insertion equipment would be constructed around a transport stream generation device as described in the previous section, an ad store to keep the content fragments for all the options of all the slots of the ad, and a management process that controls the overall insertion process when an insertion trigger is detected in the main program. To know which ad to insert at which point in time an insertion schedule is available.

Figure 9:
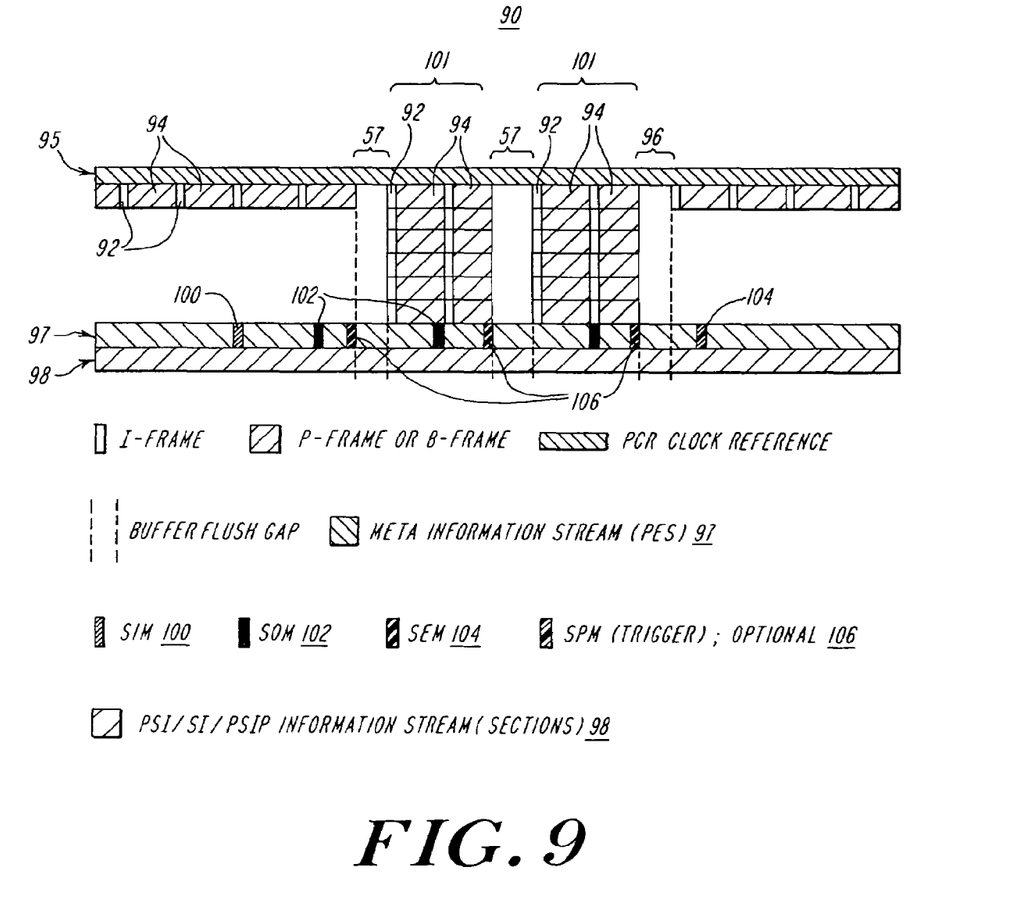
FIG. 9 shows a transport stream with a personalized message according to an illustrative embodiment.

FIG. 9 shows a transport stream 90 prepared according to an embodiment of the present invention. In this case the content selection information added by the personalization application consists of the indicated SIM (Sequence Identification Message) 100, SOM (Sequence Option Message) 102 and SEM (Sequence End Message) 104, while the switch point trigger message is indicated by the SPM message 106. In this example the personalized ad comprises two segments 101, which have multiple choices of media data, and are preceded by gaps 57 to allow for switching time to an appropriate media data segment. The transport stream 90 shown indicates a personalized ad inserted into a main program while that main program is the only one present in the transport stream 90. By means of commercial break synchronization the same personalized ad can be used for all programs transmitted in the same transport stream.

It will understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A method of preparing a plurality of data streams to allow seamless switching between said data streams by a switching device, wherein said switching device includes data stream buffering for an output data stream, said method comprising the steps of:
    preparing said plurality of data streams prior to transmitting said plurality of data streams to said switching device, wherein said preparing comprises:
        providing a plurality of data streams, said data streams including data which is divided into segments, wherein said segments include synchronized starting points and end points on all of said plurality of data streams;
        multiplexing said plurality of data streams for delivery to said switching device; and
        increasing a data rate of said multiplexed plurality of data streams from a first data rate to a second data rate at a time before an end point of each segment by changing the multiplexing for said plurality of streams to provide gaps in said plurality of data streams between said end points and said starting points wherein such changing of multiplexing does not affect the contents of said plurality of data streams, and wherein said plurality of data streams are processed at least in part on a serial basis; and
    after preparing said plurality of data streams, transmitting said multiplexed data streams to said switching device.

2. The method of claim 1 further including the step of inserting trigger gap indicators in said plurality of data streams proximate said end points.

3. The method of claim 1, wherein the step of increasing a data rate includes increasing a bandwidth of said plurality of data streams.

4. The method of claim 1, wherein the step of increasing a data rate includes compressing said data of said plurality of data streams.

5. The method of claim 1, wherein said plurality of data streams include multimedia data streams.

6. The method of claim 5, wherein said plurality of data streams include MPEG-2 encoded data streams.

7. The method of claim 6, wherein said plurality of data streams are multiplexed in an MPEG-2 transport stream.

8. The method of claim 5, wherein said plurality of data streams include AC3 encoded data streams.

9. The method of claim 1 further including the step of switching from one of said plurality of data streams to another one of said plurality of data streams at an end point of a segment by said switching device.

10. A system for preparing a plurality of data streams for transmission by a multiplexed transport stream, said system to allow a receiver receiving said transmitted data streams to seamlessly switch between said transmitted data streams; said system comprising:
    a content preparation component, coupled to a source of said plurality of data streams to prepare and encode content in said plurality of data streams with synchronized starting points and end points common to all of said plurality of data streams prior to transmitting said plurality of data streams to said receiver;
    a gap creation component, coupled to said content preparation component, said gap creation component being configured to insert gaps in said plurality of data streams between said end points and said starting points; and
    a data rate control component, coupled to said gap creation component, to dynamically control data rates of said plurality of data streams by changing the multiplexing of said plurality of said plurality of data streams, wherein such changing of multiplexing does not affect the contents of said plurality of data streams, wherein said data rate control component increases said data rate of said multiplexed data streams from a first data rate to a second data rate at a time before an end point of each segment to insert the gaps in said plurality of data streams between said end points and said starting points, and wherein said plurality of data streams are processed at least in part on a serial basis.

11. The system of claim 10 further including:
    a trigger insertion component, coupled to said data rate control component, said trigger insertion component to insert trigger messages into said plurality of data streams.

12. The system of claim 10 wherein said plurality of data streams are transmitted using an MPLG-2 compliant transport system, and said data rate control component controls data rates of said data streams in said transport stream.

\* \* \* \* \*